(No Model.) 3 Sheets—Sheet 1.
E. R. WARE.
THERMOSTATIC FUEL CONTROLLER.
No. 411,311. Patented Sept. 17, 1889.
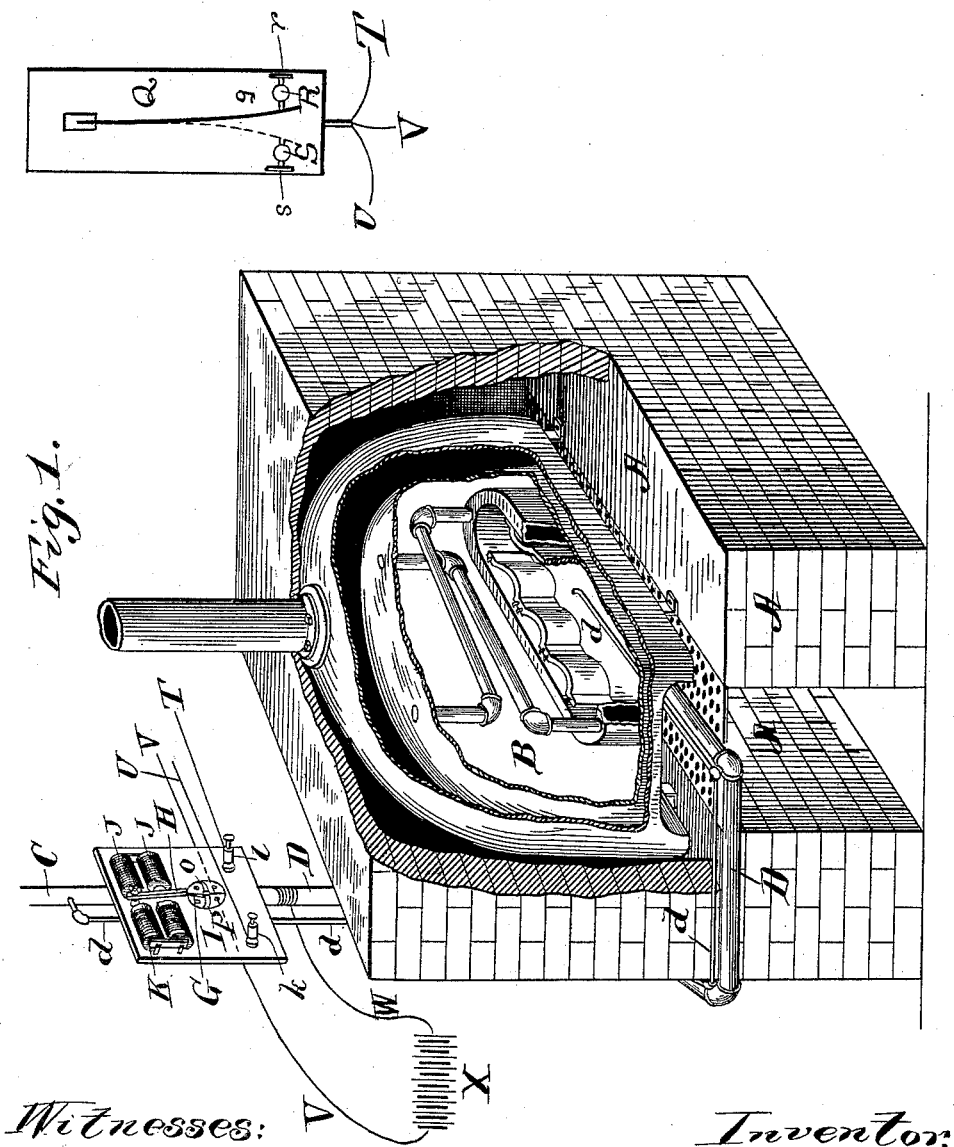

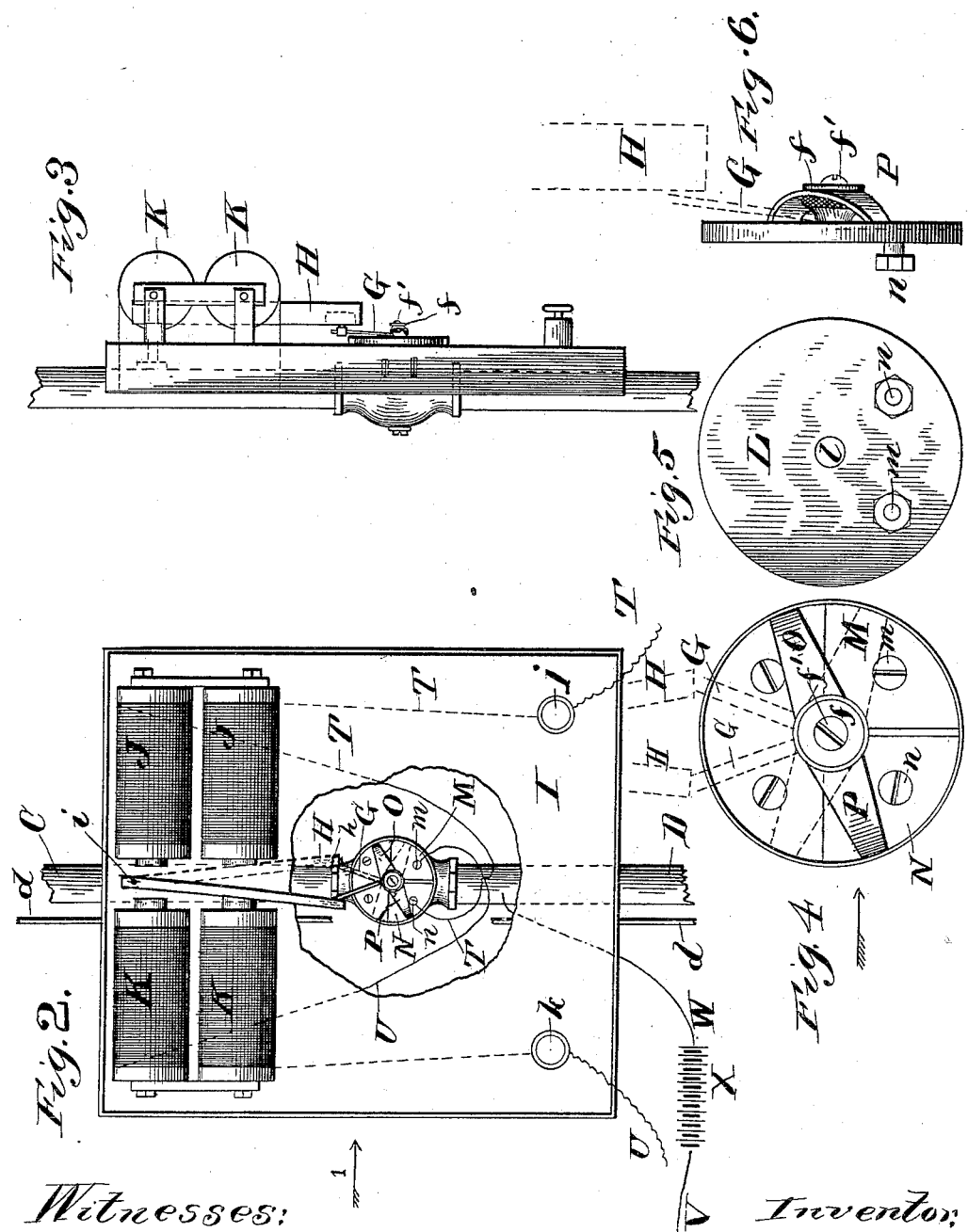

(No Model.) 3 Sheets—Sheet 3.
E. R. WARE.
THERMOSTATIC FUEL CONTROLLER.
No. 411,311. Patented Sept. 17, 1889.
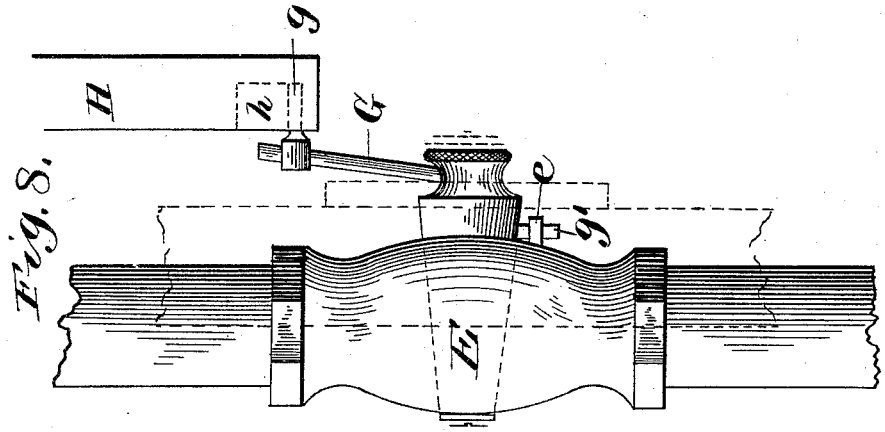
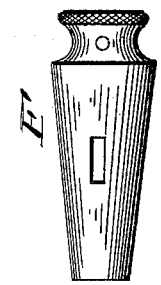
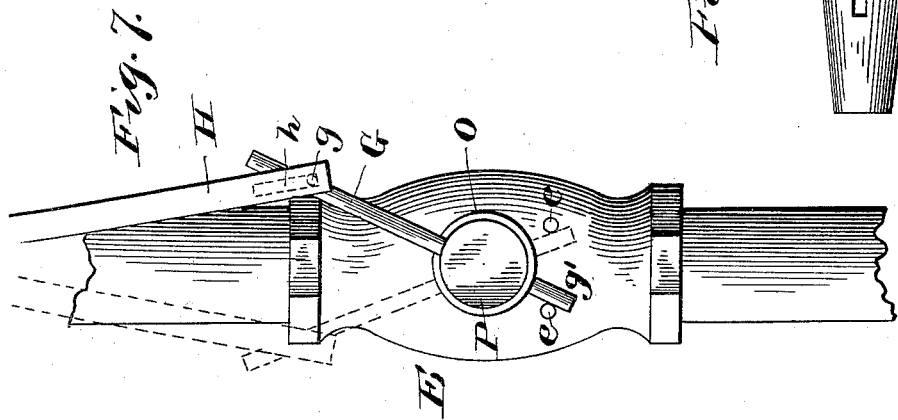
Witnesses:
J. B. McGirr.
Marcus B. May.
Inventor:
Edmund R. Ware
by H. H. Doubleday atty.

UNITED STATES PATENT OFFICE.

EDMUND R. WARE, OF WORCESTER, MASSACHUSETTS, ASSIGNOR TO THE WARE AUTOMATIC HEAT GENERATOR AND REGULATOR COMPANY.

THERMOSTATIC FUEL-CONTROLLER.

SPECIFICATION forming part of Letters Patent No. 411,311, dated September 17, 1889.

Application filed August 13, 1888. Serial No. 282,695. (No model.)

*To all whom it may concern:*

Be it known that I, EDMUND R. WARE, a citizen of the United States, residing at Worcester, in the county of Worcester and State of Massachusetts, have invented a certain new and useful Device for Automatically Controlling the Supply of Fluids, of which the following is a specification.

This invention relates to an apparatus for burning fluids for the generation of heat, and has for its principal object an automatic regulation of the supply of fuel according to the amount of heat which it is desired to produce.

I am aware that Patent No. 342,018 shows the combination of two reversely-operating electro-magnets combined with an armature and valves for regulating the amount of heat which passes from a combustion-chamber into an apartment containing a thermostat which is electrically connected to both of the magnets; but my invention operates in a radically different manner, because I regulate the amount of heat which passes from the combustion-chamber into an apartment by varying the amount of fuel delivered to the combustion-chamber, and consequently the amount of heat which is produced, one of the functions of my invention being to promote economy in the amount of fuel consumed; and to this end one part of the improvement relates to the combination of a furnace or combustion-chamber, a fuel-supply, and a fuel-regulator controlled by a thermostat so located with reference to the point at which combustion is effected that it (the thermostat) will be affected by the amount of heat produced in such manner that an undue rise of temperature will, through the medium of the thermostat and its connections, diminish the supply of fuel, while an undue reduction in the temperature will, through the medium of the thermostat and its connections, increase the supply of fuel, as will be hereinafter fully explained.

Other parts of my invention relate to details of construction and combination of parts.

Having thus explained the object and nature of my improvement, I will describe one construction of apparatus which I have in practice adopted for the purpose of carrying it into operation.

Figure 1 is a perspective view of a furnace with parts broken away to show its interior structure. Fig. 2 is a front elevation, enlarged and partly broken away, of the fuel-regulator and its immediate connections. Fig. 3 is an edge view of Fig. 2, looking in the direction of the arrow 1. Figs. 4 to 9 are details enlarged.

Like reference-letters indicate like parts in all the figures.

A B is a furnace, of which A is the inclosing brick-work and B the combustion-chamber.

C D is a feed-pipe adapted for the passage of some fluid to be used for fuel—such, for instance, as illuminating-gas from street-mains, the so-called "natural gas," or other fluid adapted for the production of heat by combustion.

As I do not herein seek to protect the particular construction of the combustion-chamber or the devices to which the fluid is delivered for burning, they need not be described, it being apparent that my invention is adapted for use with many of the well-known devices of that sort.

In addition to the feed-pipe, I propose to use a pilot-pipe $d$ for the purpose of furnishing a continuous supply of fuel to maintain a practically permanent fire or light to ignite the fuel, which is delivered through the feed-pipe, but which fuel may be interrupted and cut off as occasion shall require.

E represents generally a fuel-regulator, which in this instance is a stop-cock or gate of some usual or approved construction arranged in the feed-pipe to regulate the flow of fuel through it.

In the drawings the plug of the stop-cock is indicated by F, with an arm G projecting therefrom and connected at its upper end to a swinging armature H, preferably by means of a stud $g$ on the arm entering a slot or recess $h$ in the armature.

$g'$ is another short arm or pin projecting from the plug and adapted to engage with stops $e\ e$, which project from the body of the valve.

The armature is preferably pivoted at *i* to a base-plate I, supported upon the feed-pipe or otherwise, with an opening to receive the shank of the plug F.

J K are electro-magnets mounted on the base-plate upon opposite sides of the armature H.

*l k* are binding-posts on the base-plate.

L is a switch-plate mounted on the base-plate with a central opening *l*, through which projects the shank of the plug.

M N are contact-plates insulated from each other, but electrically connected with binding-posts *m n* of the switch-plate.

O P is a switch, preferably in the form of a yoke or bent arm, mounted centrally upon the shank of the plug and turning therewith. A convenient mode of connecting the switch with the plug is shown as consisting of a washer or button *f* with a set-screw *f'* passing through the washer and the switch into the outer end of the plug. The form of this switch is such that its ends may be made to engage alternately with the contact-plates M N, as will be explained.

Q *q* represents generally a thermostat, which may be of any usual or approved construction, although in this instance I have represented it as consisting of a metallic plate or strip Q, with a bar of platinum and rubber so connected together that although at its normal temperature it will be practically straight, yet a rise in the temperature will cause it to curl or bend in the direction indicated in full lines in Fig. 1, while a fall of the temperature below its normal will cause it to curl or bend in the opposite direction, as indicated in dotted lines, same figure.

R S are terminals or binding-posts of the thermostat, with contact-points *r s*, which are adjustable toward and from the bar *q*.

T is a wire connecting the binding-post R with the binding-post *j* of the base-plate I.

U is a wire connecting the binding-post S with the binding-post *k* of the base-plate.

V is a wire connecting the battery with the plate Q of the thermostat.

W is a wire connecting the battery with the feed-pipe, the battery being represented at X.

Suppose the temperature of a room be about that which is desired, so that the lower end of the bar *q* of the thermostat is suspended about midway between the terminals R S, and the temperature of the room falls to such a degree that the bar is curved, as indicated in Fig. 1, so as to make contact with the adjustable contact-point *r*. A circuit will at once be established through wire T, the electro-magnets J, the binding-post *n*, the contact-plate N, the end P of the switch, the valve-plug, the valve, the feed-pipe, the battery, and the wire V, whereupon the armature will be drawn over into contact with the electro-magnets J, and the fuel will be discharged into the furnace, where it will be ignited by the pilot-light.

As will be readily understood from an examination of Figs. 2 and 4, the end P of the switch will be moved off from the contact-plate M just before the armature ceases its movement from the position shown in full lines, Fig. 2, to that shown in dotted lines, same figure, so that the circuit is broken and needless expenditure of battery-power prevented. However, the end O of the switch will now be engaged with contact-plate M, so that when the temperature of the room has risen to such a point that the bar *q* of the thermostat is curved in the direction indicated by dotted line, Fig. 1, a circuit will be established through the thermostat-wire U, electro-magnets K, contact-plate M, the end O of the switch, the valve-plug, the feed-pipe, the battery, and wire V, and the armature will be moved back to its position shown in full lines, Figs. 1 and 2, and the supply of fuel cut off until the temperature has fallen so far that the first-described operations are repeated, whereby the temperature of the room may be maintained within reasonable limits in either direction from a predetermined temperature.

I am aware that it is common to attach strips of metal to the ends of a centrally-pivoted armature under such relation of parts that either of such strips is alternately moved into contact with a binding-post, so as to form part of a circuit which passes through the thermostat; but my device differs from such early ones in that, among other things, I combine my two-ended switch with the valve of my feed-regulator, whereby the valve serves not only as a pivot for the switch, but also as a part of the electrical circuit through each of the reversely-operating magnets, a feature of construction and mode of operation which is impossible with such earlier constructions.

I prefer to call the switch a "two-ended switch," because of its ends engaging alternately with the contact-plates, thus bringing these plates alternately into one of two circuits, both of which include the pivot of the switch—that is to say, the plug of the valve. It will be seen that such construction, in which the two-ended switch moves alternately in opposite directions to make and break circuit, operates radically differently from those heretofore used.

I am aware that devices have been heretofore used for automatically cutting off, in whole or in part, the supply of gas by means of a weighted arm having its swinging end supported by a movable catch connected with the armature of a magnet and a thermostat located in the flame of the heater, the arrangement of parts being such that a change of temperature of the thermostat in either direction beyond certain predetermined limits would release the catch and permit the weighted lever to move the valve in such direction as to cut off the draft-supply of gas, in whole or in part; but such device I understand to be entirely different in its construction and mode of operation from mine, in which the change produced in the thermostat by an increase of temperature establishes a circuit through an electro-magnet, the armature of which is so connected to the fluid-regulator that it operates the regulator positively to reduce the supply of fuel, while the movement produced in the thermostat by a decrease of the temperature below the normal establishes a circuit through an electro-magnet and operates through its armature to positively increase the supply of fuel; hence the electro-magnets in my invention are reversely operating, and serve to alternately reduce or increase the heat produced as any change in the temperature of the apartment may require.

While I have described the best construction now known to me for carrying out my invention, I do not wish to be limited thereby, because many modifications will readily suggest themselves to any one skilled in the art without departing from the spirit of my improvement.

What I claim is—

1. The combination of a combustion-chamber, a fuel-supply, a feed-regulator, the reversely-operating electro-magnets, the thermostat, and the electric circuits connecting the thermostat with the reversely-operating electro-magnets for actuating the fuel-regulator to alternately increase and diminish the heat, substantially as set forth.

2. The combination of a combustion-chamber, a fuel-supply, a fuel-regulator for increasing and diminishing alternately the amount of fuel, a supplemental continuous supply of fuel, the electro-magnets, the thermostat, and the electric circuits connecting the electro-magnets for operating the fuel-regulator, substantially as set forth.

3. The combination of the furnace, the fuel-supply pipe, the valve in the fuel-supply pipe, electro-magnets connected with the valve, and the thermostat, substantially as set forth.

4. The combination of the combustion-chamber, the fuel-supply, the pilot-pipe, the fuel-regulator, the electro-magnets, the thermostat, and the electric circuits connecting the thermostat with the electro-magnets, substantially as set forth.

5. The combination of the feed-pipe, the electro-magnets, the valve in the feed-pipe, the contact-plates, a switch mounted on the plug of the valve, and the electric circuit whereby the plug of the valve serves to move the switch and is utilized as part of the circuits, substantially as set forth.

6. The combination, with the valve in the fuel-supply pipe, of a pivoted two-ended switch, and the contact-plates, with each of which the switch is made to engage alternately, whereby the contact-plates, the switch, and the valve constitute parts of the electrical circuits, substantially as set forth.

7. In a device for controlling the supply of fluids, the combination of an electro-magnet, an armature pivoted near the same, a valve controlled by such armature, a yoke attached to said valve, an insulated contact-plate upon which one end of said yoke rests, the yoke and plate so related that when the electro-current is sent through such plate and yoke and electro-magnet the latter will be energized, the armature drawn to open or close the valve, as the case may be, and the end of the yoke be moved off of the plate, so as to immediately break the circuit and thus prevent the latter from wasting.

8. In a device for controlling the supply of fluid to a furnace, the combination of an electro-magnet with a circuit embracing said magnet, a thermostat, a battery, a contact-plate, and a movable yoke adapted to engage said contact-plate in one position, a valve to the plug which such yoke is secured, and an armature pivoted in front of the electro-magnet and connected with and controlling the plug, the parts arranged so that when the thermostat closes the circuit a current is instantly sent through to energize the magnet and draw the armature, and by so doing immediately turns the plug to open or close the valve, and breaks the circuit by moving the yoke from the contact-plate.

9. In a device for controlling supply of fluid to a furnace, the combination of two oppositely-placed electro-magnets with an armature pivoted between them, a valve controlled by said armature, a yoke on the plug of said valve, two contact-plates, one of which is always in contact with one end of the yoke, a thermostat having contact-points on opposite sides, and two electric circuits, each of which includes the yoke, battery, and thermostat, while one includes also one contact-point, one electro-magnet, and one contact-plate, so that when the thermostat is inclined to either side sufficiently to reach the contact-point $a$ a circuit is established through one of the electro-magnets, the armature is immediately drawn to open or close the valve, and simultaneously the circuit is broken by the movement of the yoke which carried its point off the contact-plate.

EDMUND R. WARE.

Witnesses:
CORA L. CADWALLADER,
CELESTE P. CHAPMAN.